United States Patent
Tanaka et al.

(10) Patent No.: US 9,367,550 B2
(45) Date of Patent: *Jun. 14, 2016

(54) INFORMATION PROCESSING APPARATUS AND FILE SYSTEM

(75) Inventors: Shinichi Tanaka, Kanagawa (JP); Masaharu Sakai, Tokyo (JP)

(73) Assignees: Sony Corporation, Tokyo (JP); Sony Interactive Entertainment Inc., Tokyo (JP)

(*) Notice: Subject to any disclaimer, the term of this patent is extended or adjusted under 35 U.S.C. 154(b) by 338 days.

This patent is subject to a terminal disclaimer.

(21) Appl. No.: 13/347,239

(22) Filed: Jan. 10, 2012

(65) Prior Publication Data

US 2012/0191683 A1    Jul. 26, 2012

(30) Foreign Application Priority Data

Jan. 25, 2011   (JP) .................................. 2011-013407

(51) Int. Cl.
*G06F 17/30*   (2006.01)

(52) U.S. Cl.
CPC .... *G06F 17/30091* (2013.01); *G06F 17/30233* (2013.01)

(58) Field of Classification Search
USPC .................................. 707/705; 711/162, 163
See application file for complete search history.

(56) References Cited

U.S. PATENT DOCUMENTS

| | | | |
|---|---|---|---|
| 6,259,444 B1 | 7/2001 | Palmer et al. | |
| 2004/0015723 A1* | 1/2004 | Pham et al. | 713/201 |
| 2006/0123061 A1* | 6/2006 | Puustinen | 707/200 |
| 2007/0067586 A1* | 3/2007 | Mikami | G06F 11/1471 711/162 |
| 2007/0285719 A1* | 12/2007 | Kobayashi | G06F 8/60 358/1.16 |
| 2008/0141018 A1 | 6/2008 | Tanaka | |
| 2009/0125902 A1* | 5/2009 | Ghosh | G06F 9/45533 718/1 |
| 2010/0114889 A1* | 5/2010 | Rabii et al. | 707/737 |
| 2010/0235831 A1* | 9/2010 | Dittmer | G06F 9/45558 718/1 |
| 2011/0252209 A1* | 10/2011 | Lee | G06F 12/1441 711/163 |
| 2012/0084768 A1* | 4/2012 | Ashok | G06F 9/45558 717/174 |

FOREIGN PATENT DOCUMENTS

| | | |
|---|---|---|
| JP | 05-250241 A | 9/1993 |
| JP | 07-013774 A | 1/1995 |
| JP | 07-248908 A | 9/1995 |

OTHER PUBLICATIONS

Office Action for corresponding JP Application No. 2011-013407, dated Jan. 8, 2013.

Isao Ohishi, et al., "Hack the File System!," BSD magazine, (Japan: ASCII Corporation, No. 10, p. 139-144, (Dec. 14, 2001) (For relevancy see Office Action for Application No. 2011-013407, dated Jan. 8, 2013, p. 2 paragraph 2).

* cited by examiner

*Primary Examiner* — Shyue Jiunn Hwa
(74) *Attorney, Agent, or Firm* — Matthew B. Dernier, Esq.

(57) ABSTRACT

In an information processing apparatus, a file system manages files in a storage unit. Upon receipt of a boot instruction, a process boot unit starts an application. Once the application is started, a path acquisition unit acquires the path to an application file in the storage unit. A mount unit associates the path acquired by the path acquisition unit with a predetermined virtual mount point. A processor specifies the predetermined mount point and then accesses the file.

6 Claims, 8 Drawing Sheets

| PROCESS ID | TITLE ID | PATH INFORMATION | MOUNT POINT |
|---|---|---|---|
| 1 | ABCTENNIS2 | device:/game/ABCTENNIS2/ | GAME0 |
| 2 | DEFSOCCER | device:/game/DEFSOCCER/ | GAME0 |
| ⋮ | ⋮ | ⋮ | ⋮ |

FIG.10

| PROCESS ID | TITLE ID | CONTENTS | PATH INFORMATION | MOUNT POINT |
|---|---|---|---|---|
| 1 | ABCTENNIS2 | boot_game.b | device:/patch/ABCTENNIS2/boot_game.b | GAME0 |
| 1 | ABCTENNIS2 | data1.dat | device:/patch/ABCTENNIS2/data1.dat | GAME0 |
| 1 | ABCTENNIS2 | data2.dat | device:/game/ABCTENNIS2/data2.dat | GAME0 |
| 1 | ABCTENNIS2 | newdata/pr.b | device:/patch/ABCTENNIS2/newdata/pr.b | GAME0 |
| 1 | ABCTENNIS2 | sys/parameter.a | device:/patch/ABCTENNIS2/sys/parameter.a | GAME0 |
| ... | ... | ... | ... | ... |

INFORMATION PROCESSING APPARATUS AND FILE SYSTEM

BACKGROUND OF THE INVENTION

1. Field of the Invention

The present invention relates to an information processing technique implemented by an information processing apparatus such as a game device.

2. Description of the Related Art

Game software are generally distributed and sold in the form of an ROM medium such as an optical disk, magneto-optical disk, or Blu-ray disk. The game software recorded in a ROM medium cannot be rewritten, and so patches are applied when bugs, if any, in parts of the game software are to be fixed or the functions are to be altered. Reference (1) in the following Related Art List, for example, discloses a game device that performs game booting by loading into memory a boot file with newer version information after comparing the version information contained in a patch file against the version information recorded in a recording medium.

RELATED ART LIST (1) United States Patent Application Publication No. 2008/0141018 A1

With the development of the Internet, an environment has been created in which game files, including game programs, and patch files are distributed from servers to user terminals over the Internet. Downloaded game files and patch files are installed in a storage of the user terminal and managed by a file system. A game program, when booted, needs to access the contents held in the game file or the patch file, but the game program does not normally have a grasp of where in the storage the contents are being held. Therefore, the game program may, for instance, call a system utility, inquire about a necessary path to the contents, and access the file following the path.

Even when a utility is available that searches for the path and conveys the thus searched path to the game program, it is also possible that the game program, as appropriate, has the path-to-be-accessed embedded therewithin. However, file management must always be carried out by the file system of the user terminal. Therefore, there may be instances where the game program accesses an inappropriate file if a path different from the actual path in the file system is embedded there. In view of these situations, the development of a system that enables both efficient and secure file management is desired.

Also, in the presence of a patch file, the system executes a game booting process by loading a boot file of the patch file in memory. At this time, however, the game file and the patch file are stored in their respective areas of the storage. Therefore, it is necessary that the patch file to be executed recognizes itself being a patch file and then accesses the original game file. Thus, in accessing a certain data file, the game program must decide each time whether it is a game file or a patch file to be accessed. As a result, in the presence of a patch file, the file access process is made complicated by the need for operation to determine the path.

SUMMARY OF THE INVENTION

A purpose of the present invention is therefore to provide a technology for efficiently executing file access.

In order to resolve the aforementioned problems, an information processing apparatus according to one embodiment of the present invention includes: a storage unit configured to store an application file used to execute an application; a file system configured to manage a file in the storage unit; a booting unit configured to boot the application upon receipt of a boot instruction; and a processor configured to execute the application, and the file system includes: a path acquisition unit configured to acquire a path to the application file when the booting unit boots the application; and a mount unit configured to associate the path acquired by the path acquisition unit with a predetermined m virtual mount point. The processor specifies the predetermined mount point so as to access the file.

Another embodiment of the present invention relates to a file system. The file system manages files in a storage unit that stores an application file, and the file system includes: a path acquisition unit configured to acquire a path to the application file when an application is booted; and a mount unit configured to associate the path acquired by the path acquisition unit with a predetermined virtual mount point.

Optional combinations of the aforementioned constituting elements, and implementations of the invention in the form of methods, apparatuses, systems, recording medium, computer programs and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

Figure 1:
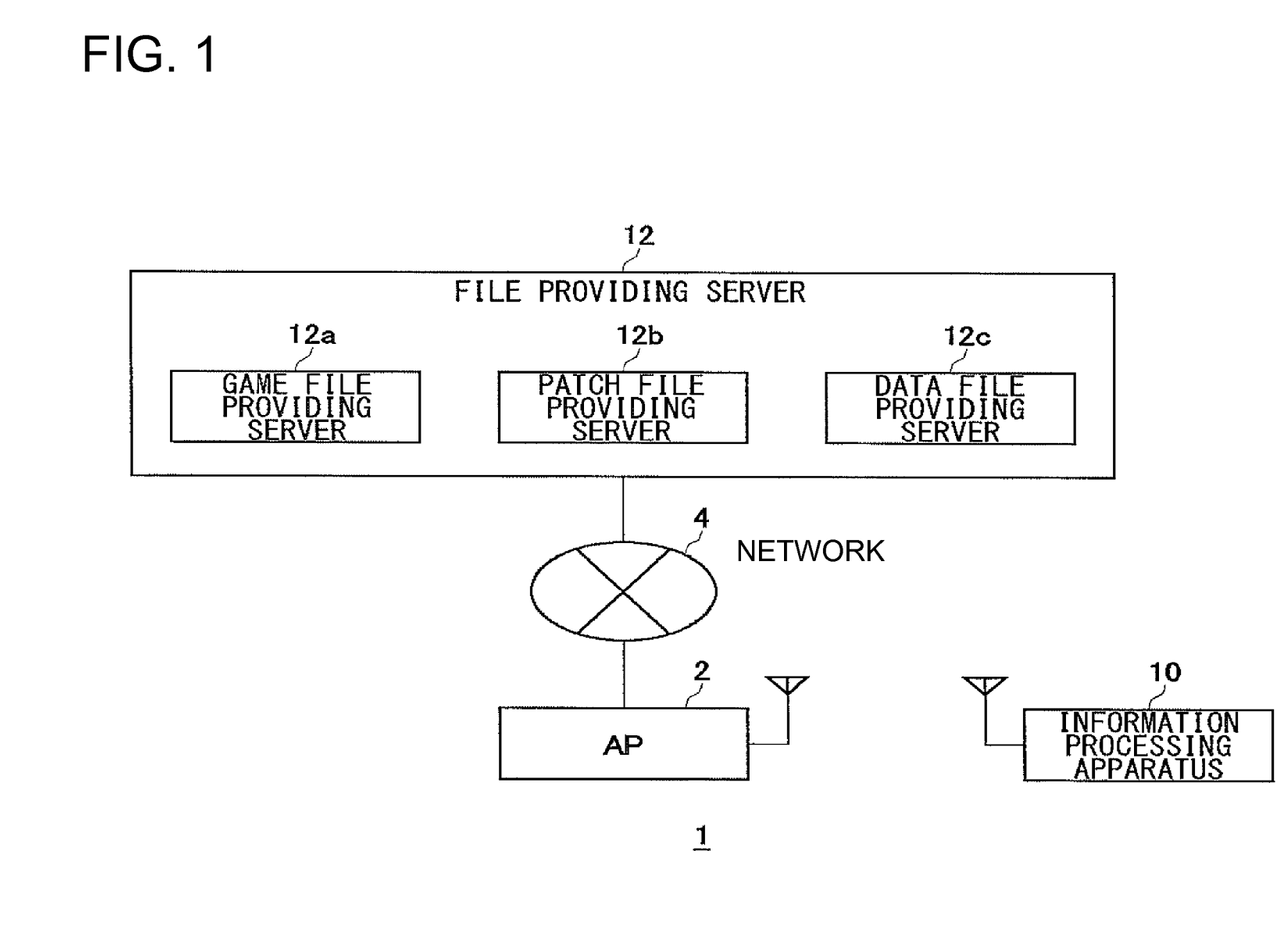
FIG. 1 shows an information processing system according to an embodiment of the present invention.

FIG. 1 shows an information processing system 1 according to an exemplary embodiment of the present invention. The information processing system 1 includes an information processing apparatus 10, which is a user terminal, and a file providing server 12. The file providing server 12 includes a game file providing server 12a, which provides game files including game programs, a patch file providing server 12b, which provides patch files to be applied to the games, and a data file providing server 12c, which provides data files to be used in the games.

The information processing apparatus 10, the game file providing server 12a, the patch file providing server 12b, and the data file providing server 12c are connected in a manner that permits communication via a network 4 such as the Internet or wired LAN. The information processing apparatus 10, which is equipped with a wireless communication function, downloads a desired file from the file providing server 12 by connecting to the network 4 via an access point (hereinafter referred to as "AP") 2. The AP 2 functions as a relay unit that connects the information processing apparatus 10 to another access point by wireless LAN (Local Area Network) or connects the information processing apparatus 10 to the network 4. Thus the information processing apparatus 10 may have a communication function by wireless LAN, but the information processing apparatus 10 may also download files from the file providing server 12 by connecting to a mobile telephone network using a mobile telephone communication scheme such as the third-generation mobile communication system.

The game file providing server 12a, the patch file providing server 12b, and the data file providing server 12c may be constituted by a single server, but may also be constituted by a plurality of servers. Also, two or more combinations of the game file providing server 12a, the patch file providing server 12b, and the data file providing server 12c may be constituted by a single server.

The game file providing server 12a provides game files. A game file includes a boot file, a group of files for executing a game such as a game program, and a group of files to be used by the system software of the information processing apparatus 10. The game program is a program necessary for the execution of a game, and the game progresses as the game program is run. The boot file is a program for starting the game program, and the game program is called out and executed as the boot file is executed. The group of files to be used by the system software includes, for instance, game icon image data to be displayed on a menu image of the information processing apparatus 10.

The patch file providing server 12b provides a patch file to be applied to a game. The patch file includes a game program with the bugs fixed, a data file for changing game functions, and the like. The patch file has the same file composition as that of the game file and includes contents to be replaced with contents included in the game file. As used herein, the term "contents" or "content" refers collectively to programs, data files, and the like contained in the game file or the patch file.

Thus, when both the game file and the patch file are installed and when the contents bearing the same name is included in both the game file and the patch file, the information processing apparatus 10 executes a game using the contents included in the patch file. Though described later, a game file and a patch file are stored in their respective separate directories and therefore the contents of the game file is not overwritten by the contents of the patch file. It is also to be noted that when plural versions of patch files are downloaded by the information processing apparatus 10, the information processing apparatus 10 uses the contents of a patch file of a newer version and thus the game is executed using the most up-to-date version.

The data file providing server 12c provides data files constituting new characters or game scenes that are to be added to the progress of an original game. The data files held by the data file providing server 12c are used in an additional manner along the progress of the original game and therefore these data files will be referred to as "additional data file" or "additional data files" hereinafter.

Figure 2:
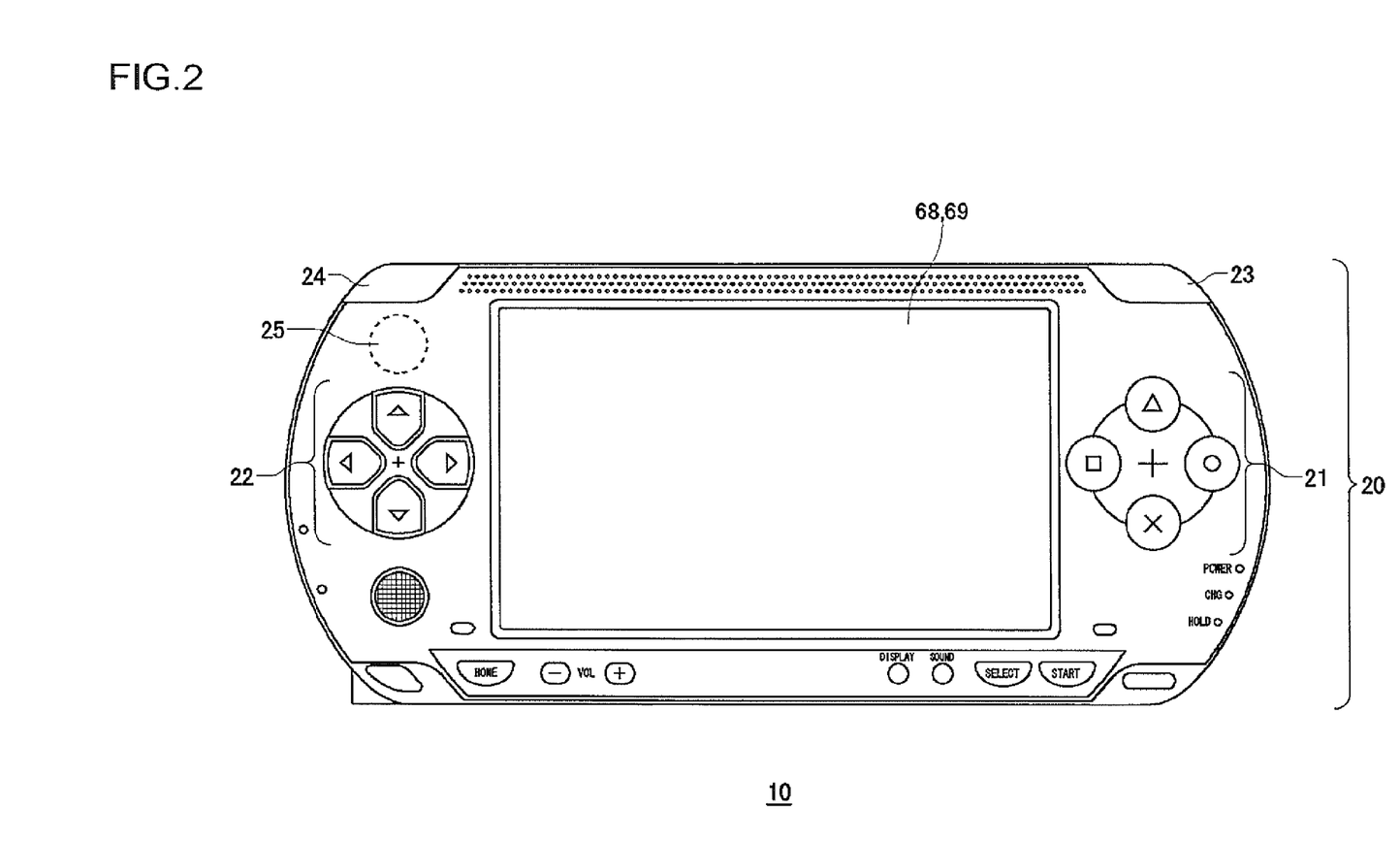
FIG. 2 shows an example of the appearance of an information processing apparatus according to an exemplary embodiment of the present invention.

FIG. 2 shows an example of the appearance of an information processing apparatus 10 according to an exemplary embodiment of the present invention. The information processing apparatus 10 shown in FIG. 2 is a mobile terminal equipped with a wireless communication function. Also, it should be appreciated that the information processing apparatus 10 may be connected to the network 4 via cable and it may be a stationary terminal, instead of a mobile terminal.

As shown in FIG. 2, input devices 20, such as instruction input buttons 21, direction keys 22, an R button 23, and an L button 24, and a display device 68 are provided on the front side of the information processing apparatus 10, which is the side thereof facing a user who holds and operates it. The display device 68 is provided with a touch panel 69 that detects contact by a finger of the user or a stylus pen or the like. Provided inside the information processing apparatus 10 is a motion sensor 25 capable of detecting the inclination of the information processing apparatus 10. It should be noted also that the information processing apparatus 10 may be provided with a back touch panel on the back side thereof.

The user, while holding the information processing apparatus 10 with both hands, can operate the instruction input buttons 21 with the thumb of the right hand, the direction keys 22 with the thumb of the left hand, the R button 23 with the index finger or the middle finger of the right hand, and the L button 24 with the index finger or the middle finger of the left hand, for instance. Also, when operating the touch panel 69, the user may hold the information processing apparatus 10 with both hands and operate the touch panel 69 with the thumbs of both hands, or may hold the information processing apparatus 10 with the left hand and operate the touch panel 69 with the right hand, the direction keys 22 with the thumb of the left hand, and the L button 24 with the index finger or the middle finger of the left hand.

Figure 3:
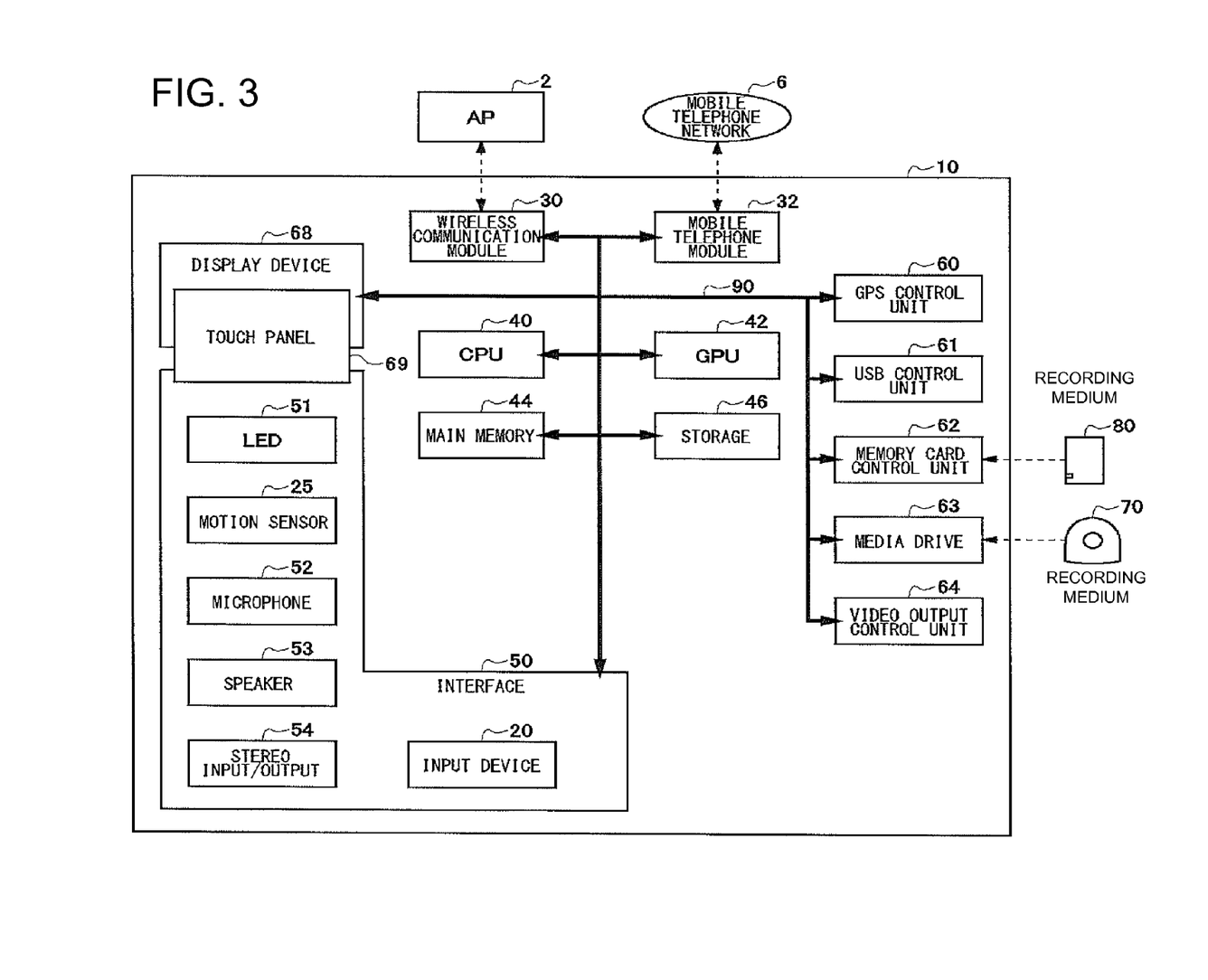
FIG. 3 shows a circuit configuration of an information processing apparatus.

FIG. 3 shows functional blocks of the information processing apparatus 10. The display device 68 display images generated by the respective functions of the information processing apparatus 10. The display device 68 may be a liquid crystal display device or an organic EL display device. The touch panel 69 is so provided as to be superimposed on the display device 68, and detects the touch or contact of a user's finger, pen or the like. The touch panel may implement any of a resistive overlay method, a surface electrostatic capacitive method, a projected electrostatic capacitive method, and the like. In the information processing apparatus 10, the display is comprised of the display device 68 and the touch panel 69.

A wireless communication module 30 is constituted by a wireless LAN module compliant with a communication standard such as IEEE 802.11b/g, and connects to the network 4 via the AP 2. The wireless communication module 30 may communicate directly with the other information processing apparatus 10 in ad-hoc mode. A mobile telephone module 32 is compatible with a third digital mobile telephone scheme compliant with the international mobile telecommunication 2000 (IMT-2000) standard prescribed by the International Telecommunication Union (ITU), and the mobile telephone module 32 connects to a mobile telephone network 6. A subscriber identity module (SIM) card, in which a unique ID number to identify a telephone number of a mobile telephone has been recorded, is inserted to the mobile telephone module 32.

In an interface 50, an LED (light emitting diode) 51 blinks while the wireless communication module 30, the mobile telephone module 32, and the like transmit and receive data. A motion sensor 25 detects the movement of the information processing apparatus 10. A microphone 52 inputs sound surrounding the information processing apparatus 10. A speaker 53 outputs audio generated by the respective functions of the information processing apparatus 10. A stereo input/output terminal 54 receives the input of stereo audio from an external microphone, and outputs the stereo audio to an external headphone or the like. An input device 20 includes the aforementioned operation keys and the like and receives the input of a user's operation.

A CPU (central processing unit) 40 executes programs and the like loaded in main memory 44. A GPU (graphics processing unit) 42 performs computations necessary for the image processing. The main memory 44 is comprised of RAM (random access memory) and the like, and stores programs, data, and so forth that run and operate in the information processing apparatus 10. A storage 46 is comprised of NAND-type flash memory and the like, and stores programs, data, and so forth. The storage 46 is used as a built-in type auxiliary storage for a recording medium 80 (described later).

A GPS (global positioning system) control unit 60 receives signals from GPS satellites and computes the present position. A USB (universal serial bus) control unit 61 controls communications between peripheral devices connected via USBs. A memory card control unit 62 controls read and write of data between the recording medium 80, with the recording medium 80 such as flash memory inserted into the receiving section. As the recording medium 80 is inserted into the receiving section, the recording medium 80 is used as an external auxiliary storage. A media drive 63 controls read and write of data between the game recording medium 70, with the game recording medium 70, which has recorded game files, inserted to the media drive 63.

Game files are recorded in the game recording medium 70, and the user can play a game by inserting the game recording medium 70 to the media drive 63. A writable storage area is provided and reserved in the game recording medium 70, and a patch file and an additional data file, for example, may be written to the writable storage area. As described above, in the information processing apparatus 10, the game file can be downloaded from the game file providing server 12*a* and can be installed in the storage 46 or the recording medium 80. Thus, the information processing apparatus 10 has a function of executing the game files recorded in the game recording medium 70 or those installed in the recording medium 80. A video output control unit 64 outputs video signals to an external display device, based on a standard such as HDMI (high definition multimedia interface). The above-described respective functional blocks are connected with each other by a bus 90.

A description is now given of the summary of exemplary embodiments. As a technical background of the exemplary embodiments, when an application is to access its own file, the application does not have a grasp of where the application itself, namely its application file, is stored. Accordingly, as a way of accessing the file, there is a method in which a desired file is accessed in a manner such that the storage location of the file is checked by the system utility based on the application ID and then the path information indicating the path location is received from the system utility. However, if this method is employed, the application can access the storage relatively freely and, for example, it is possible, in theory, that the application can access application files other than the application file belonging to its own application without using a utility. This is not desirable in terms of security.

Thus, in the information processing apparatus 10 according to the present exemplary embodiment, a file system associates the path of an application file with a virtual predetermined mount point (e.g., "GAME0"). The application file contains beforehand the information with which this mount point "GAME0" is identified, and the application file accesses the file by specifying this mount point. The correspondence between the mount point and the path of the application file is managed by the file system, so that the application does not need to specify the actual path of the file and the application can access a desired file by simply specifying "GAME0". From a security viewpoint, the file system does not accept any path specification other than the path specification of the mount point which has already been set even when the application specifies the path of a file. Thus the access to the applications is substantially restricted and therefore the security can be improved.

Even if a plurality of applications are booted, each application can access its file by specifying the same mount point "GAME0". This is realized by distinguishing each application process with the process ID. Thus, by employing the information processing apparatus 10 according to the present exemplary embodiment, there is no need of being conscious of the storage location of the application file and also the file can be accessed by simply specifying the mount point "GAME0". This is advantageous in that the burden on game makers to development the file access can be considerably reduced.

Figure 4:
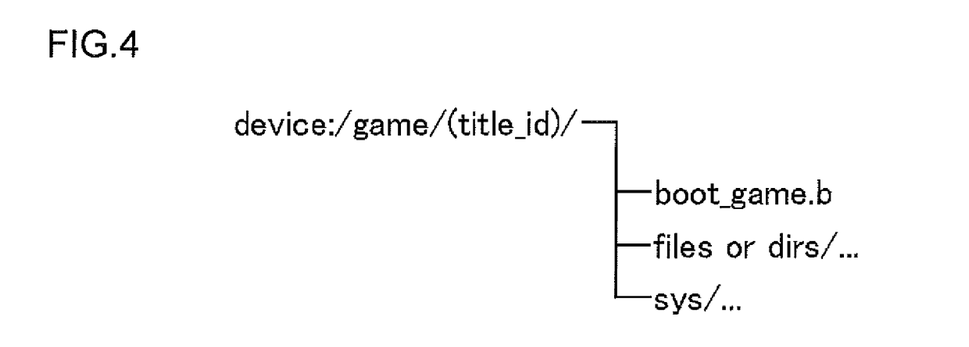
FIG. 4 shows a directory structure of game files.

FIG. 4 shows a directory structure of game files. Here "device:" specifies the storage 46, and the directory structure shown in FIG. 4 indicates the storage locations within the storage 46. However, game files may also be recorded in the recording medium 80 or the game recording medium 70. The game files are stored in the "game" directory. All of the game files have each a title ID for unique identification, and each game file in the "game" directory is stored in a subdirectory identified by the title ID (title_id). It is to be noted that the "title_id" constituting a subdirectory may be a title ID itself or a code generated from the title ID.

"boot_game.b" represents a boot file for initially starting the system software upon receipt of a boot instruction from the user. "files or dirs", which represents files or directories collectively, shows the state in which a group of files constituting a game is stored. "sys" stores a group of files used by the system software. This group of files includes a parameter file defining a title ID, an icon image file to be displayed on the menu screen by the system software, and the like.

Figure 5:
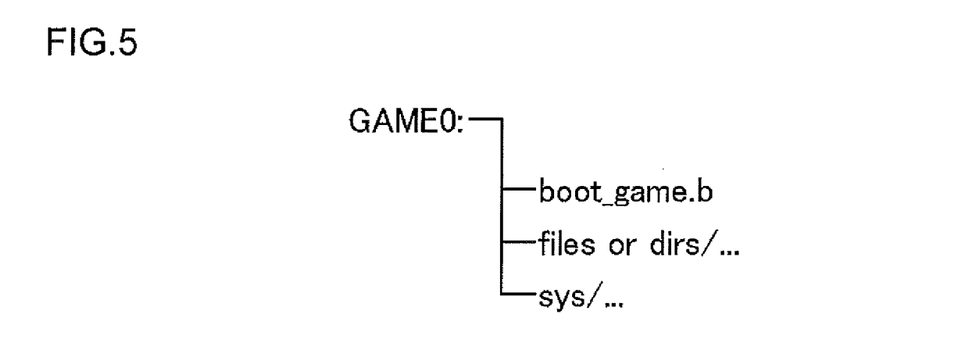
FIG. 5 shows a virtual directory structure of a game file mounted at a predetermined mount point "GAME0" by a file system.

FIG. 5 shows a virtual directory structure of a game file mounted at the predetermined mount point "GAME0" by the file system. The file system provides a directory structure shown in FIG. 5 to a game. Accordingly, the game can access a file in the game file by specifying the mount point "GAME0". For example, if the file access command is expressed as "open ( )", then the game sending the command of "open ("GAME0: data1.dat")" to the file system will cause the file system to recognize this command as an access command of "device:/game/(title_id)/data1.dat" as shown in FIG. 4 and the game to read out the "data1.dat" from the storage 46. As a result, the game has no need to know the actual storage location of "data1.dat" and can access the file by simply specifying the mount point "GAME0".

In the present exemplary embodiment, when there is any patch file, the file system of the information processing apparatus 10 executes an overlay processing of the patch file on the game file. The patch file as intended in this exemplary embodiment has the same file structure as the game file and carries contents to replace the contents of the game file. The overlay processing in this exemplary embodiment is a processing to virtually create a state in which the directory storing a game file is overwritten with a patch file. It should be noted, however, that the game file and the patch file are stored in separate locations and therefore the game file is not actually overwritten with the patch file. Thus, the game can access the patch file without being aware of the patch file because, when the game accesses the directory storing the game file, the file system switches over to the path directed to the patch file as needed. Described in the following is an example in which the directory storing the game file is a virtual directory as shown in FIG. 5, but it should be understood that the directory may also be an actual directory as shown in FIG. 4.

Figure 6:
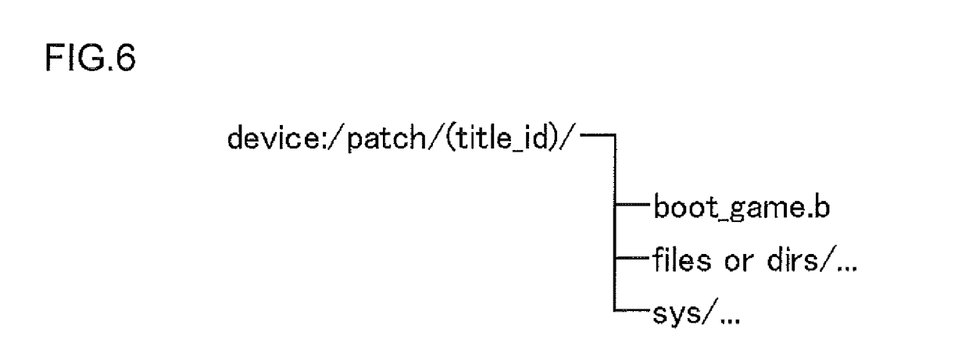
FIG. 6 shows a directory structure of a patch file.

FIG. 6 shows a directory structure of patch files. The patch files are stored in a "patch" directory. In the "patch" directory, the patch files are each stored in a subdirectory identified by the title ID (title_id). A patch file has the same directory structure as that of a game file shown in FIG. 4, but carries contents only necessary for updating or addition, of the contents carried by the game file. Note that although "boot_game.b" is included in the example shown in FIG. 6, it will not be included in the patch file if the "boot_game.b" included in the original game file has no need of updating.

Figure 7:
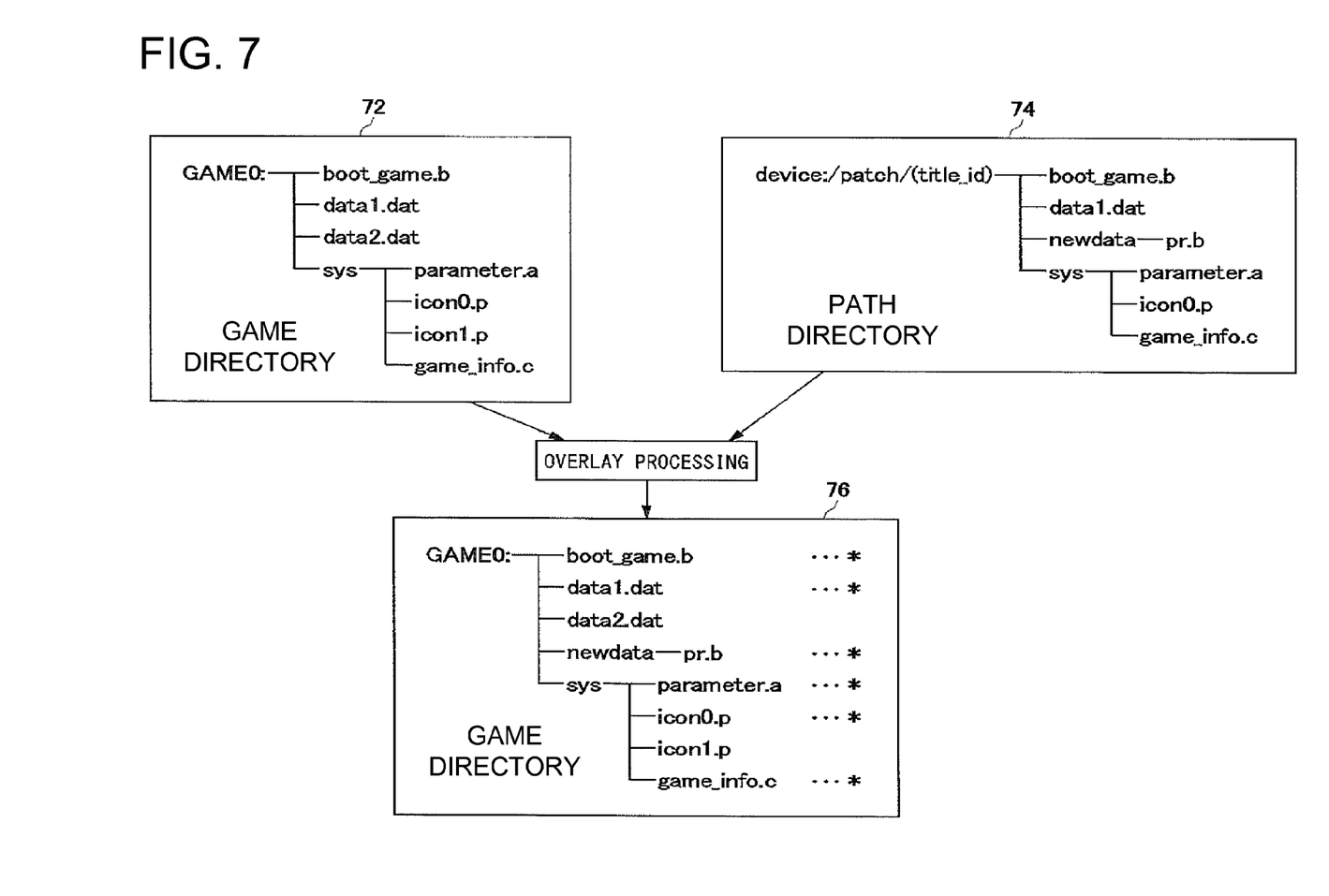
FIG. 7 is a diagram for explaining an overlay processing.

FIG. 7 is a diagram for explaining an overlay processing. Shown for a game directory 72 is a virtual directory structure of a game file mounted at the mount point "GAME0". In the game directory 72, "boot_game.b" is the boot file of the game, and "data1.dat" and "data2.dat" are the data files of the game, respectively. "parameter.a" is a parameter file of the game to be used by the system software, "icon0.p" and "icon1.p" are the icon image data to be displayed on the menu screen, and "game_info.c" is the information data of the game to be displayed on the menu screen.

Shown for a patch directory 74 is a directory structure of a patch file. When a game is executed, the contents included in the game directory 72 are replaced by the contents of the patch file. In this example, the "boot_game.b", "data1.dat", "parameter.a", "icon0.p", and "game_info.c" contained in the patch file are used in the place of the files with the same names contained in the game file. Note that "pr.b" in a patch file represents additional data for the game The file system generates a virtual game directory 72 by mounting a game file at a predetermined mount point and then searches for a patch file having the same title ID. Upon finding the patch file, the file system searches out the contents of the game file to be virtually overwritten from the game directory 72. In this example, the "boot_game.b", "data1.dat", "parameter.a", "icon0.p", and "game_info.c" are extracted. Note that the "pr.b" is also extracted as a file to be added to the game file.

Upon extracting the files to be overwritten, the file system virtually generates a game file that is shown in a game directory 76. It should be understood that the file system does not actually overwrite the directory of the game file with the patch file, but generates a virtual game directory 76 which has the game file overwritten with the patch file. The contents marked with "*" in the game directory 76 are contained in the patch file and are actually stored in the patch directory 74. Therefore, with the file system executing an overlay processing, the game can access desired contents without being conscious of whether the contents to be accessed are those contained in the game file or in the patch file.

Figure 8:
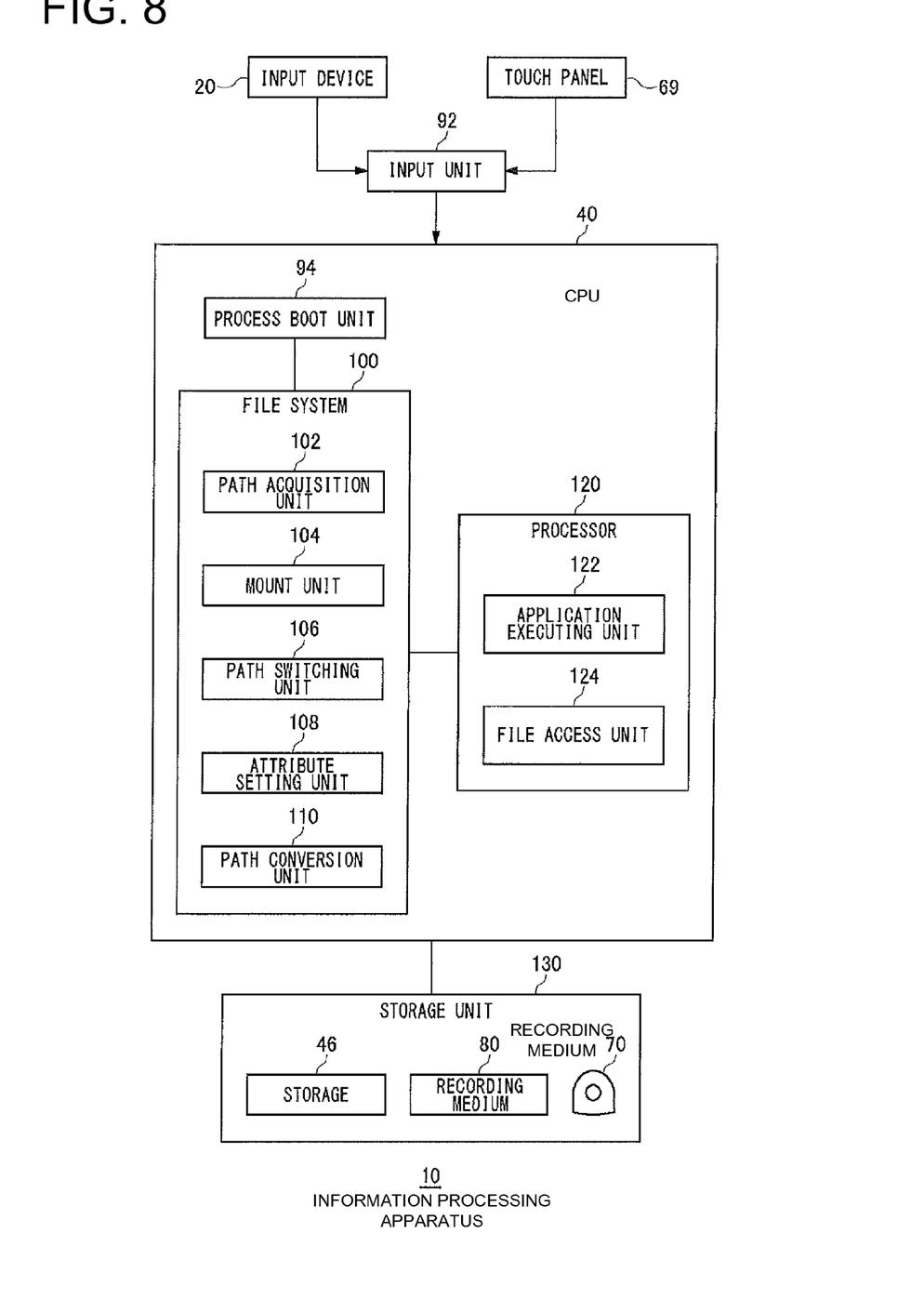
FIG. 8 shows functional blocks for managing files in an information processing apparatus.

FIG. 8 shows functional blocks for managing files in the information processing apparatus 10. The main memory 44, the GPU 42 and the like are omitted in FIG. 8. The information processing apparatus 10 includes an input device 20, a touch panel 69, an input unit 92, a CPU 40, and a storage unit 130. Those components are realized, in terms of hardware components, by a CPU, memory and the like of an arbitrary computer, and softwarewise by memory-loaded programs or the like. Depicted herein are functional blocks implemented by cooperation of hardware and software. Therefore, it will be obvious to those skilled in the art that the functional blocks may be implemented by a variety of manners including hardware only, software only or a combination of both.

The input unit 92 receives operation instructions which are inputted by the user through the input device 20 and the touch panel 69. The storage unit 130, which stores a game file to be used in the execution of a game, includes a storage 46, a recording medium 80, and/or a game recording medium 70. Note that, when there is any patch file, the storage unit 130 records the patch file in a directory other than that of the game file. It is also to be noted that the game file and the patch file may be stored in any of the storage 46, the recording medium 80, and the game recording medium 70. For convenience of explanation, however, the description hereinbelow assumes that the game file and the patch file are stored in the storage unit 130.

The CPU 40 includes a process boot unit 94, a file system 100, and a processor 120. The file system 100, which manages files in the storage unit 130, includes a path acquisition unit 102, a mount unit 104, a path switching unit 106, an attribute setting unit 108, and a path conversion unit 110. The functions of the file system 100 are implemented by the kernel layer of system software or the utility software or the like. The processor 120, which executes a game, includes an application executing unit 122 and a file access unit 124. The processor 120 is implemented by the game software and the utility software.

A description will first be given of a virtual mount processing by the file system 100. Prior to the execution of a game, the system software generates a menu screen with game icons on the display device 68. The game icons are generated, for example, from "icon0.p" shown in the game directory 72 of FIG. 7. As the user selects a game icon through the input device 20 or the touch panel 69, the input unit 92 receives a selection operation by the user and conveys the received selection operation to the process boot unit 94. The process boot unit 94 receives the notification as a boot instruction of the game. The process boot unit 94 identifies the title ID of the game specified by the selection operation, searches out the boot file (boot_game.b) of the game title ID from the storage unit 130, and boots it.

In doing so, the process boot unit 94 gives a process ID to the application thus booted. The process boot unit 94 gives the process IDs in order of booting the applications. Therefore, the applications being executed are distinguished by means of the process IDs. Accordingly, when a plurality of games are executed simultaneously, the commands from each game are distinguished by means of the process IDs. Note that the following description will be given on the assumption that the title ID of the game is "ABC TENNIS 2" and the process ID is "1". Upon booting the boot file of the game "ABC TENNIS 2", the process boot unit 94 conveys a boot signal together with the process ID and game title ID to the file system 100.

In the file system 100, the path acquisition unit 102 searches the storage unit 130, using a game title ID, and acquires a path directed to the game file to be executed. As shown in FIG. 4, in the present exemplary embodiment, a game file is stored in a directory identified by the title ID. Therefore, the path acquisition unit 102 acquires a path to the game file by searching for the directory containing "/game/ABCTENNIS2". As the path acquisition unit 102 acquires the path to the game file, the mount unit 104 associates the path with the predetermined virtual mount point "GAME0" and thereby generates a correspondence table. Note that, once a boot file is booted, the path acquisition unit 102 and the mount unit 104 execute a mount processing automatically without any instruction from the processor 120.

Figure 9:
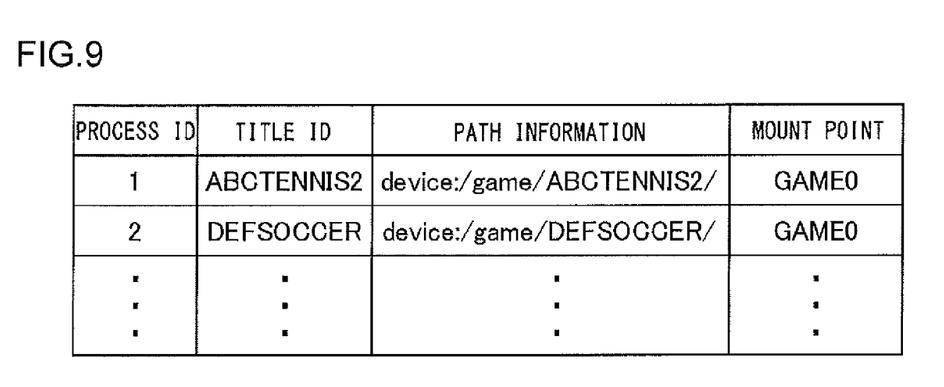
FIG. 9 shows a correspondence table which is generated by a mount unit.

FIG. 9 shows a correspondence table which is generated by the mount unit 104. Recorded in the correspondence table are the process ID, the title ID, the path information of the game file, and the mount point in correspondence with each other. It is to be noted that, in the correspondence table of FIG. 9, the process ID and the path information of the game file are associated with each other in one-to-one correspondence, but the arrangement may be such that the process ID is associated one-to-one with the path information of each of the files (contents) contained in the game file. The processor 120, when sending a file access command to the file system 100, adds a process ID to the command. The file system 100 can identify the access point of the file by referencing the process ID and identifying the path information associated therewith in the correspondence table.

For purposes of illustration, FIG. 9 shows a correspondence table which is generated when a game having another game title ID "DEF SOCCER" is further booted after the booting of ABC TENNIS 2. As shown, the mount unit 104 sets the same mount point as that of "ABC TENNIS 2" for the game process of "DEF SOCCER". In this manner, the file system 100 sets the same mount point "GAME0" for all the game files and manages the file paths by the process IDs.

Thus, the mount processing by this file system 100 enables a game to access the game file using a virtual directory structure as shown in FIG. 5. Note that the game file already contains information by which to identify the mount point "GAME0". Therefore, with a boot file booted, the boot file accesses necessary contents, using the mount point "GAME0". And, with a game program booted, the game program accesses desired contents, using the mount point "GAME0" also.

The functions of the processor 120 are implemented as a boot file is executed by the process boot unit 94 and a game program is executed by the boot file. The application executing unit 122 controls the progress of a game, and the file access unit 124 reads out files necessary for the progress of the game from the storage unit 130. For example, when data file "data1.dat" is to be read out from the storage unit 130, the file access unit 124 sends a command of "open ("GAME0: data1.dat")", together with the process ID, to the file system 100. In the file system 100, the path conversion unit 110 identifies the path information associated with the mount point "GAME0" from the process ID and converts the virtual mount point to the path (device:/game/ABCTENNIS2/data1.dat) in the storage unit 130. As a result, the file access unit 124 can access "data1.dat" in the storage unit 130.

Now a description will be given of the overlay processing by the file system 100. An overlay processing in the present exemplary embodiment is executed after the path to a game file is mounted at a virtual mount point. After the mount unit 104 has generated the correspondence table as shown in FIG. 9, the path acquisition unit 102 searches the storage unit 130 for the presence of any patch file having the same game title ID. Without the presence of such a patch file, the overlay processing will not be executed. As shown in FIG. 6, a patch file according to the present exemplary embodiment is stored in a patch directory identified by a title ID. Hence, the path acquisition unit 102 searches for a directory containing "/patch/ABCTENNIS2" and, if there exists such a directory, acquires the path to the patch file. As the path acquisition unit 102 acquires the path to the patch file, the path switching unit 106 compares the patch file with the game file by referencing the directory of the patch file. More specifically, the path switching unit 106 switches the path directed to the contents of the game file with the path directed to the contents of the patch file if there is contents with the same name in both the game file and patch file.

Referring to FIG. 7, the path switching unit 106 compares the contents of the game directory 72 with the contents of the patch directory 74. Thus, the path switching unit 106 determines that "boot_game.b", "data1.dat", "parameter.a", "icon0.p", and "game_info.c" are overlapping and that "pr.b" is included only in the patch directory 74. The path switching unit 106 receives the results of this determination and generates a virtual game directory 76. The contents marked with "*" in the game directory 76 are contents in the patch file. In the overlay processing, the mount unit 104 generates a correspondence table by setting path information for each of the contents.

Figure 10:
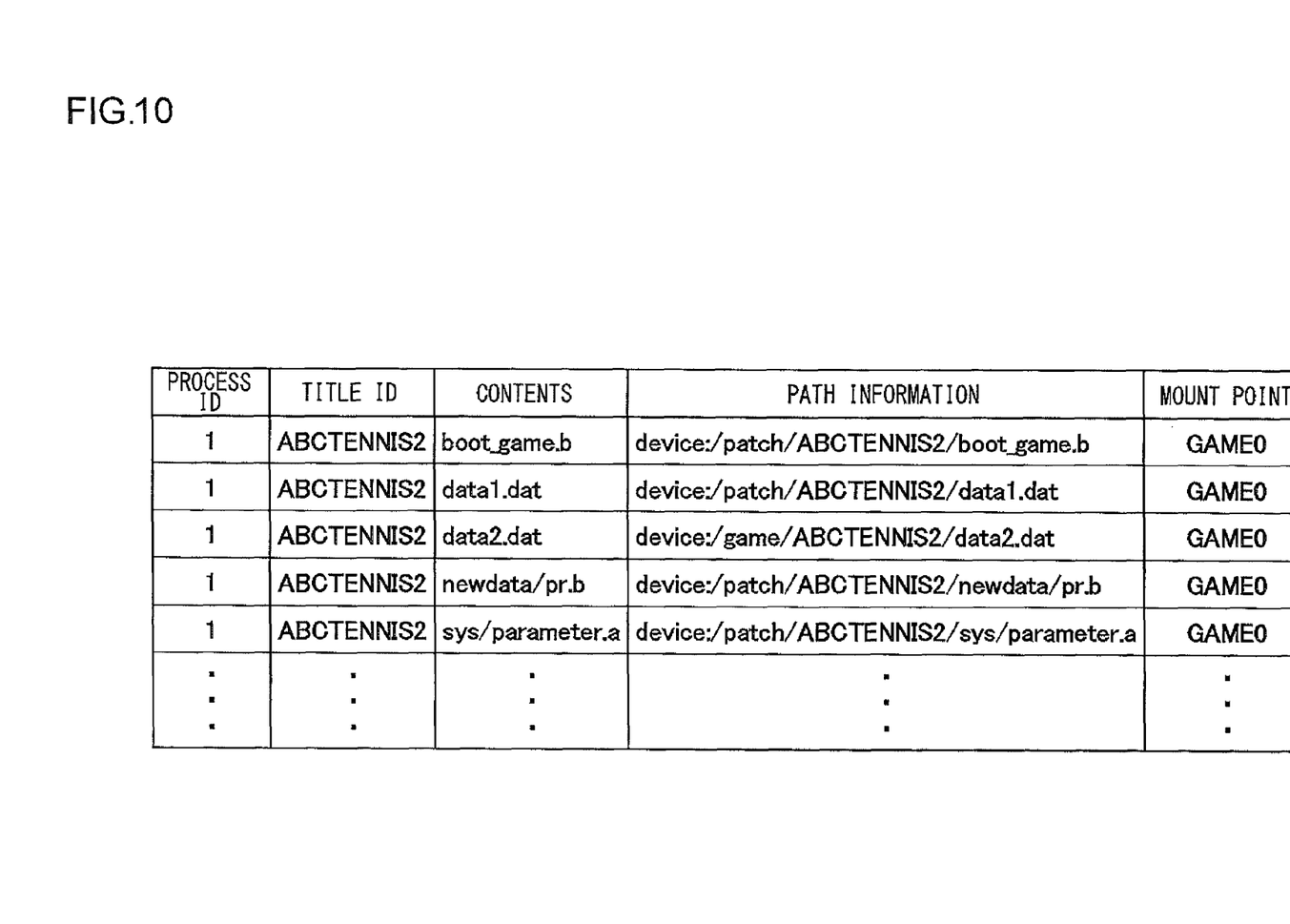
FIG. 10 shows a correspondence table generated by a mount unit.

FIG. 10 shows a correspondence table generated by the mount unit 104. Recorded in the correspondence table are a process ID, a title ID, a content, the path information of the content, and a mount point in correspondence with each other. As shown, the path information of the patch directory is recorded as the path information of contents that are overlapping in the game file and the patch file. It is to be noted that the mount point "GAME0" remains unchanged. Thus, the mount unit 104 generates a correspondence table without changing the mount point and thereby can provide a virtual game directory 76, which has an appearance of the game file overwritten with the patch file, to the processor 120. Accordingly, it is not necessary for the file access unit 124 in the processor 120 to be conscious of whether the files to be accessed are in the game file or the patch file, which has an effect of making file access processing simpler.

When the path acquisition unit 102 has found a plurality of patch files through a search of the storage unit 130, the path acquisition unit 102 acquires the version information on the patch files, acquires the path to the patch file of the latest version, and conveys the acquired path to the path switching unit 106. Note that when the version information for the plurality of patch files is the same, the path acquisition unit 102 acquires the path to the patch file of a newer update (installation) date. In the case of executing a game file in the game recording medium 70, if the version information for the patch files recorded in the recording medium 80 and the game recording medium 70 respectively is the same, it is preferable that the path acquisition unit 102 acquires the path to the patch file recorded in the game recording medium 70 irrespective of the update dates. This will allow the execution of the game with the file access unit 124 accessing the game recording medium 70.

It should be appreciated that the information processing apparatus 10 according to this exemplary embodiment can mount the path to a file other than a game file at a virtual mount point, using the mechanism of the mount processing as described above.

The information processing apparatus 10 stores an additional data file downloaded from the data file providing server 12c in the storage unit 130. The additional data file is stored in "adddata" directory. The additional data file is also stored in a subdirectory identified by a title ID (title_id) the same way as the game file and the patch file. Accordingly, the directory of the additional data file is structured as "device:/adddata/(title_id)/".

When the file access unit 124 in the processor 120 accesses the additional data file, the game will firstly call an additional data mount API processing module and have this module execute a mount processing of the additional data file. More specifically, the additional data mount API processing module instructs the mount unit 104 to execute a mount processing of the desired additional data file. This instruction contains the process ID, the game title ID, the information identifying the mount point (e.g., "adddata0"), and the information identifying the additional data file.

Upon receipt of the instruction from the additional data mount API processing module, the mount unit 104 mounts the specified path to the additional data file to the specified mount point "adddata0". As a result, the file access unit 124 can access the desired additional data file by specifying the mount point "adddata0". Also, when the paths to a plurality of additional data files are to be mounted, the additional data mount API processing module has the mount points vary from each other by providing information specifying the mount points, such as "adddata1" and "adddata2", so that the file access unit 124 can access desired additional data files.

Also, the processor 120 can access a save data file stored in "savedata" directory in the storage unit 130. The save data file is also stored in a directory identified by a title ID (title_id) the same way as the game file and the patch file. Accordingly, the directory of the save data file is structured as "device:/savedata/(title_id)/".

When the file access unit 124 in the processor 120 accesses the save data file, the game will firstly call the save data mount API processing module and have this module execute a mount processing of the save data file. More specifically, the save data mount API processing module instructs the mount unit 104 to execute a mount processing of the desired save data file. This instruction contains the process ID, the game title ID, the information identifying the mount point (e.g., "savedata0"), and the information identifying the save data file.

Upon receipt of the instruction from the save data mount API processing module, the mount unit 104 mounts the specified path to the save data file to the specified mount point "savedata0". As a result, the file access unit 124 can access the desired save data file by specifying the mount point "savedata0". Also, when the paths to a plurality of save data files are to be mounted, the save data mount API processing module has the mount points vary from each other by providing information specifying the mount points, such as "savedata1" and "savedata2", so that the file access unit 124 can access desired save data files.

Further, the processor 120 can also access another game file. For example, in the case where "ABC TENNIS 2" can use the characters and the like of "ABC TENNIS 1", which has a version older than that of "ABC TENNIS 2", a password for the execution of "ABC TENNIS 1" is recorded in advance in a sys directory of "ABC TENNIS 2". This password is unique to "ABC TENNIS 1" and is recorded in the sys directory of "ABC TENNIS 1" also.

"ABC TENNIS 2" calls the game mount API processing module and has this module execute a mount processing of the other game. More specifically, the game mount API processing module instructs the mount unit 104 to execute a mount processing of the game file to be accessed. This instruction contains the process ID, the game title ID, the information identifying the mount point (e.g., "GAME1"), the information identifying the other game file, and the password of the other game file.

Upon receipt of the instruction from the game mount API processing module, the mount unit 104 determines whether the password of the specified game file is in agreement with the password contained in the sys directory of the specified game file. If no agreement is determined, the mount processing will not be executed. On the other hand, if an agreement is determined, the mount unit 104 will mount the path to the other game file at the specified mount point "GAME1". As a result, the file access unit 124 can access "ABC TENNIS 1" by specifying the mount point "GAME1". At this time, if there exists a patch file of the other game file, the path switching unit 106 executes the overlay processing. As a result, the file access unit 124 can access the other game file.

It is to be noted that the attribute setting unit 108 can set attributes to the respective mount points. Here the attribute identifies "read only" or "read/write enable" concerning the access restriction. The attribute setting unit 108 sets the attribute of "read only" to the access point containing "GAME", which is a game file or a game file having been overlay-processed. In a similar manner, the attribute setting unit 108 sets the attribute of "read only" to the access point containing "adddata", which is an additional data game file. On the other hand, the attribute setting unit 108 sets the attribute of "read/write enable" to the access point containing "savedata", which is a save data file. The file system 100 processes the command from the file access unit 124 in compliance with the attribute set by the attribute setting unit 108. For example, even when a write request is sent to the file of "GAME0", the file system 100 rejects the request because the attribute of "read only" is set to the file of "GAME0". This will prevent situations in which a file is operated unauthorizedly or illegally.

The present invention has been described based upon illustrative exemplary embodiments. The above-described embodiments are intended to be illustrative only and it will be obvious to those skilled in the art that various modifications to the combination of constituting elements and processes could be developed and that such modifications are also within the scope of the present invention. In the exemplary embodiments, games are cited and implemented as an example of applications but applications other than games may be implemented instead.

What is claimed is:

1. An information processing apparatus comprising:
 a storage unit configured to store, using a directory structure, application files including: a group of files including an application program, and a boot file for starting the application program;
 a file management unit configured to manage a file stored in the storage unit using the directory structure;
 a booting unit configured to execute the boot file upon receipt of a boot instruction; and
 a processor configured to execute the application program after execution of the boot file,
 wherein the booting unit gives a process ID to an application process upon executing the boot file,
 wherein the file management unit includes:
   a path acquisition unit configured to acquire a path to the application file in the storage unit when the booting unit executes the boot file;
   a mount unit configured to associate the path acquired by the path acquisition unit with the process ID and a predetermined mount point, where the predetermined mount point is a single mount point shared by the application program and at least one other application program; and
 an attribute setting unit configured to set an attribute of the mount point to read-only or read/write-enable, and
 wherein the processor specifies the predetermined mount point and the process ID so as to access the file related to the application process given the process ID.

2. An information processing apparatus according to claim 1, wherein the application file contains information that identifies the predetermined mount point.

3. An information processing apparatus according to claim 1, wherein the mount unit generates a correspondence table that associates the predetermined mount point and the path to the application file with the process ID.

4. An information processing apparatus according to claim 1, wherein the mount unit executes a mount processing without any instruction from the processor.

5. An information processing apparatus according to claim 1, wherein:

when the booting unit executes boot files of a plurality of applications, the booting unit gives different process IDs to respective application processes, and the mount unit defines the same mount point to a plurality of application processes and associates, for the respective application processes, the acquired path with the process ID and the defined mount point.

6. A non-transitory, computer-readable medium containing a program that is executable by a computer, the program comprising:

an acquisition module configured to acquire, when a boot file of an application program is started, a path to an application file in a storage unit configured to store, using a directory structure, application files including: a group of files including the application program, and a boot file for starting the application program;

a correspondence module configured to associate the acquired path with a process ID given to an application process as a result of execution of the boot file and with a predetermined mount point, where the predetermined mount point is a single mount point shared by the application program, and at least one other application program, and an attribute of the mount point is read-only or read/write-enable; and a specifying module configured to specify the path associated with the predetermined mount point and the process ID, when a command designating the predetermined mount point and the process ID is received.

* * * * *